United States Patent [19]

DeLamoreaux et al.

[11] 4,181,823
[45] Jan. 1, 1980

[54] RADIO AND TAPE PLAYER APPARATUS

[75] Inventors: Murray I. DeLamoreaux, Hoffman Estates; Paul D. McGee, Medinah, both of Ill.

[73] Assignee: Motorola, Inc., Schaumburg, Ill.

[21] Appl. No.: 946,697

[22] Filed: Sep. 28, 1978

[51] Int. Cl.² .......................... G11B 1/04; G11B 31/00
[52] U.S. Cl. ................................. 179/100.11; 360/137; 325/311; 312/12
[58] Field of Search ..................... 360/137; 274/9 B, 2; 179/100.11, 100.12 A; 325/311, 353, 352; 312/12, 14, 16

[56] References Cited
U.S. PATENT DOCUMENTS

| | | | |
|---|---|---|---|
| 3,505,602 | 4/1970 | Morrell | 325/352 |
| 3,888,494 | 6/1975 | Herst | 360/137 |
| 3,981,265 | 9/1976 | Gilbert | 179/100.11 |

*Primary Examiner*—Bernard Konick
*Assistant Examiner*—Alan Faber
*Attorney, Agent, or Firm*—Melvin A. Klein; James W. Gillman

[57] ABSTRACT

Combined radio and tape player apparatus in which the tape cartridge is inserted through a movable door pivotally mounted in the housing of said radio for the tape playing mode of operation. A plurality of touch control switches are arranged on the door for controlling operation of the radio during the radio playing mode of operation.

Movement of the door into an open position is resisted by a latching force which is sufficient to resist opening of the door during the operation of the touch control switches but is insufficient to overcome a greater force acting on the door upon insertion of the tape during the tape playing mode of operation.

6 Claims, 9 Drawing Figures

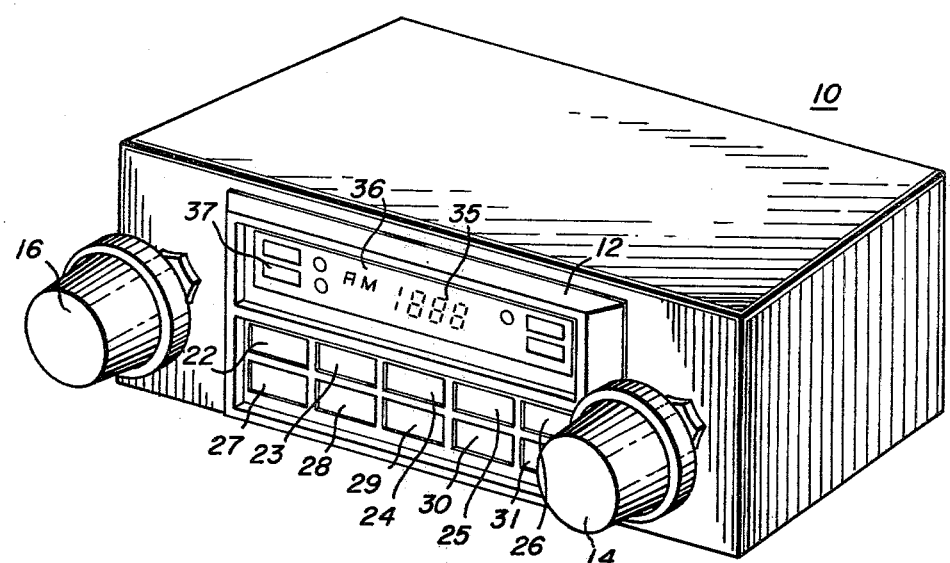
FIG. 1
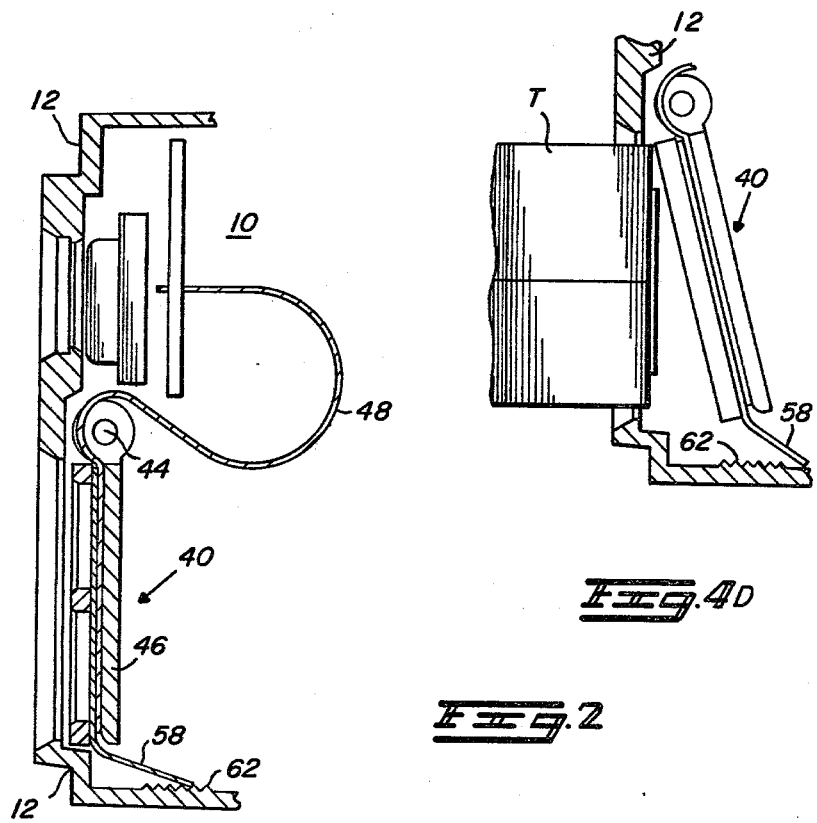
FIG. 4D
FIG. 2

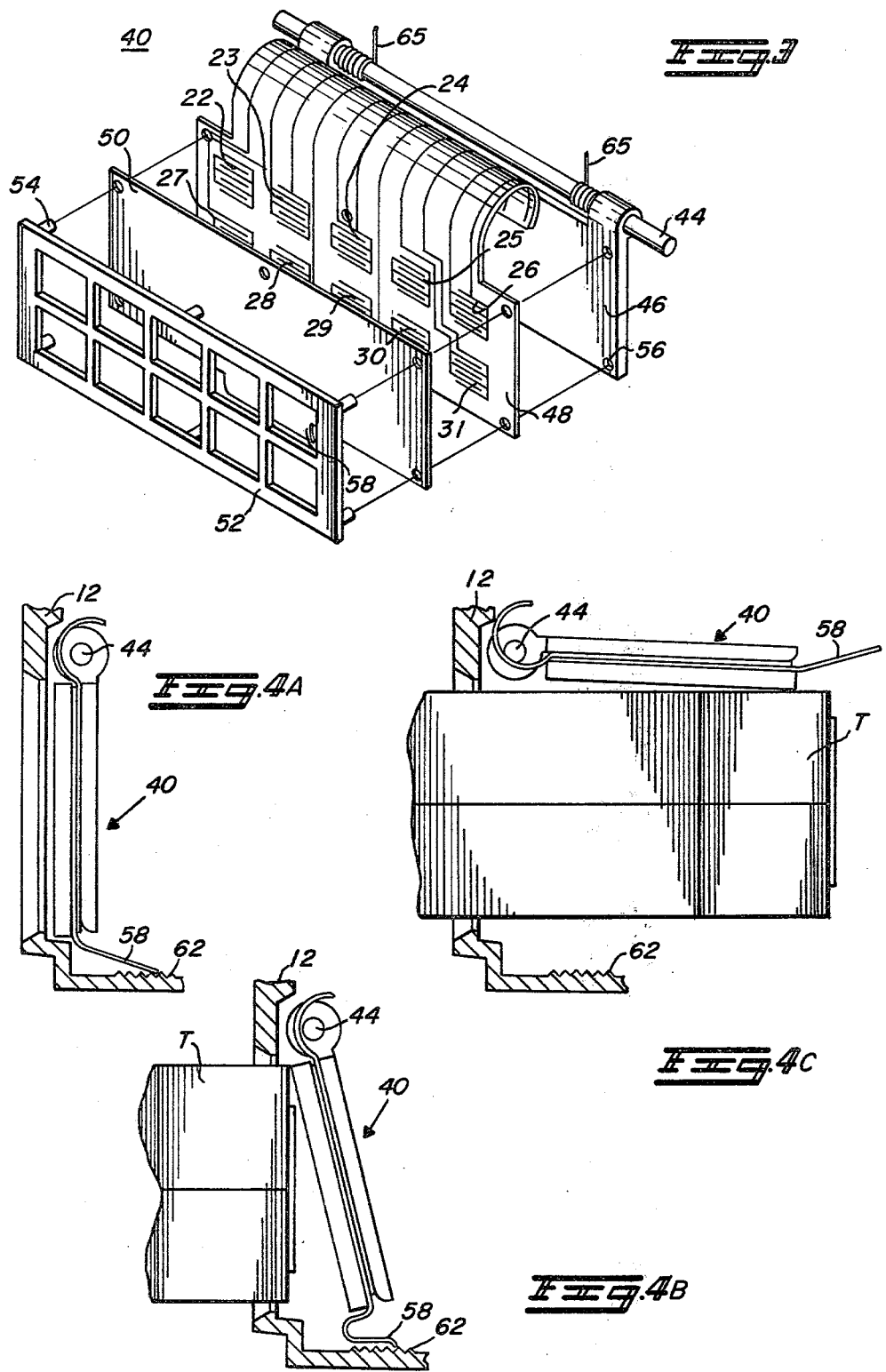

RADIO AND TAPE PLAYER APPARATUS

BACKGROUND OF THE INVENTION

This invention relates to an improved radio and tape player apparatus and more particularly to the functional controls for the radio and tape playing modes of operation.

It is known to have a radio with a tape player in a unitary structure wherein the door through which the tape cartridge is inserted is also used as a structure for the dial scale of the radio as described, for example, in U.S. Pat. Nos. 3,536,859 and 3,981,265. In each of these constructions, however, the control knobs and switches for the radio are attached to the housing of the radio. With the advent of electronic radios and other vehicular entertainment design configurations where there are space constraints, the arrangement of the control knobs and switches has become a problem from the standpoint of location and functionality providing ease of operation.

SUMMARY OF THE INVENTION

It is therefore a primary object of the invention to improve radio and tape player apparatus.

It is a further object of the present invention to enable the control knobs and switches of the radio in a tape player and radio apparatus to be positioned on the door through which the tape is inserted in the tape player mode of operation.

It is still a further object of the present invention to achieve radio and tape player modes of operation within a unitary apparatus in a manner more versatile than heretofore. It is still further object of the present invention to provide a radio and tape player apparatus with a more simplified construction and operation than used heretofore.

The above objects as well as others are accomplished generally speaking by positioning touch control switches on a pivotally mounted door through which the tape is inserted in the tape playing mode of operation. The construction of the door is such that there is a predetermined force resisting opening of the door during operation of the control switches for the radio mode of operation but which is also displaceable to receive a tape for the tape playing mode of operation.

BRIEF DESCRIPTION OF THE DRAWINGS

A greater appreciation of the invention may be had with the following detailed description which should be read in conjunction with the accompanying drawings in which:

FIG. 1 is a front view of the combined radio and tape player apparatus according to the present invention;

FIG. 2 is a side sectional view of the apparatus according to the invention;

FIG. 3 is an exploded isometric view of a door assembly of the invention,

FIGS. 4A-D are sequential views illustrating the different positions of the door assembly for the radio and tape playing modes of operation;

DETAILED DESCRIPTION OF THE PREFERRED EMBODIMENT

Figure 5:
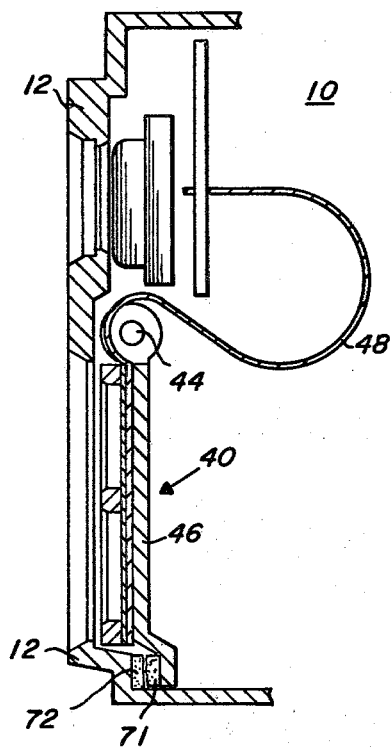
FIG. 5 is a side sectional view of another embodiment of the invention.

Referring now to FIG. 1 and 2 of the drawings there is shown a combined radio receiver and tape player apparatus generally designated 10 which includes a control panel or nose piece 12, a tuning control knob 14 and an on/off switch 16. The nose piece 12 further includes touch control switches 22-31 including 22-26 for selecting radio frequencies, 27 for selecting either AM or FM frequency bands, 28 for seeking down, 29 for seeking up, 30 for scan and 31 for load. The nose piece 12 further includes digital read-out 35 and indicators 36 and associated buttons generally designated 37.

Referring to FIG. 3, it will appreciated that touch control switches 22-31 are included as part of a door assembly generally designated 40. Door assembly 40 is pivotally mounted within nose piece 12 on an axis 44 and includes a door member 46, a flex circuit member 48, a polycarbonate graphic plate member 50 with conductive pads corresponding to switches 22-31 and a control cover panel 52 for securing the flex circuit and graphic plate members to the door member 46 as by use of heat staked pins 54 which are received through openings 56. It will be noted that plate member 50 has a latch tongue 58 extending therefrom which engages with a serrated surface 62 formed in nose piece 12.

The construction of the flex circuit member 48 and the polycarbonate graphic plate member 50 is such that touch switches 22-31 are formed providing switching circuitry normally isolated from one another requiring about a four to a ten ounce activation force. Touch control switches of this type are presently available and are manufactured, for example, by the Name Plate division of W. H. Brady Company, Milwaukee, Wisconsin under the tradename "Lite Touch Panel". It should be understood that other types of touch control switches could be used in place of those shown as, for example, a non-pressure touch switch as known by those skilled in the art.

Referring now to FIGS. 4A-4D the latching operation for the combined radio and tape player apparatus will now be described. Initially the door assembly 40 is in the closed position as indicated by FIG. 4A. For the radio mode of operation door assembly 40 remains in the closed position due to the resistance provided by the engagement of the serrated surface 62 with latch tongue 58 of the door assembly. Upon inserting a tape T for the tape playing mode of operation a predetermined force must be imparted to the door assembly to overcome the frictional forces between the latch tongue 58 and the serrated surface 62 such that the door assembly is pivoted into an open position as shown in FIGS. 4B and 4C. It will be appreciated that there is both a flexing and compression force exerted on the latch tongue 58 dislodging it from serrated surface 62 of the nose piece 12. Upon removal of the tape T door assembly 40 pivots downwardly with an assist from torsion spring 65 as shown in FIG. 4D to resume its original closed position.

Figure 6:
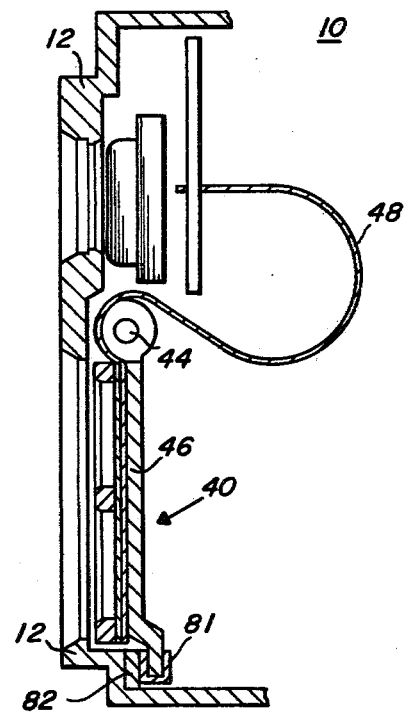
FIG. 6 is a side sectional view of still another embodiment of the invention.

FIGS. 5 and 6 show alternative embodiments for the latching construction of door assembly 40 and nose piece 12. Thus in FIG. 5 there is included hook and pile fastening members 71 and 72 in place of latch tongue 58 and serrated surface 62, respectively. Similarly, in FIG. 6 magnetic strip 81 and metallic strip 82 are used in lieu of latch tongue 58 and serrated surface 62, respectively.

It will now be appreciated that the touch control switches included in the door assembly enable operation of the controls for the radio mode of operation and yet permit tape insertion for the tape playing mode of operation. For the tape playing mode of operation the door assembly is pivoted upwardly to allow the insertion of the tape into its proper position due to the unique construction of the door assembly. Furthermore, it will be appreciated that by virtue of the unique configuration of the invention a greater functional arrangement of the radio controls is provided greatly enhancing the use and versatility of combined apparatus of this type in vehicles where convenience of operation and space constraints are most important.

While the invention has been shown in a specific embodiment, it will be appreciated that various changes and modifications can be made without departing from the spirit or scope of the claims.

We claim:

1. A radio and tape player apparatus comprising:
a frame,
door means pivotally connected to said frame having a closed position for a radio playing mode and an opened position for a tape playing mode,
a plurality of touch control switches arranged on the door means for controlling operation of the radio during the radio playing mode,
said door means and frame including latching means for engagement therebetween during the radio playing mode and which disengage for the tape playing mode,
said latching means having a predetermined latching force sufficient to overcome a force acting on said door means during operation of said switches in the radio playing mode but insufficient to overcome a force acting on said door means upon insertion of a tape during the tape playing mode.

2. Apparatus according to claim 1 wherein said touch control switches are operated by a predetermined force.

3. Apparatus according to claim 1 wherein said touch control switches are of the non-pressure type.

4. Apparatus according to claim 1 wherein said latching means include a flexible member engaging with a serrated surface.

5. Apparatus according to claim 1 wherein said latching means include hook and pile members.

6. Apparatus according to claim 1 wherein said latching means include magnetically held members.

* * * * *